United States Patent Office 3,496,069
Patented Feb. 17, 1970

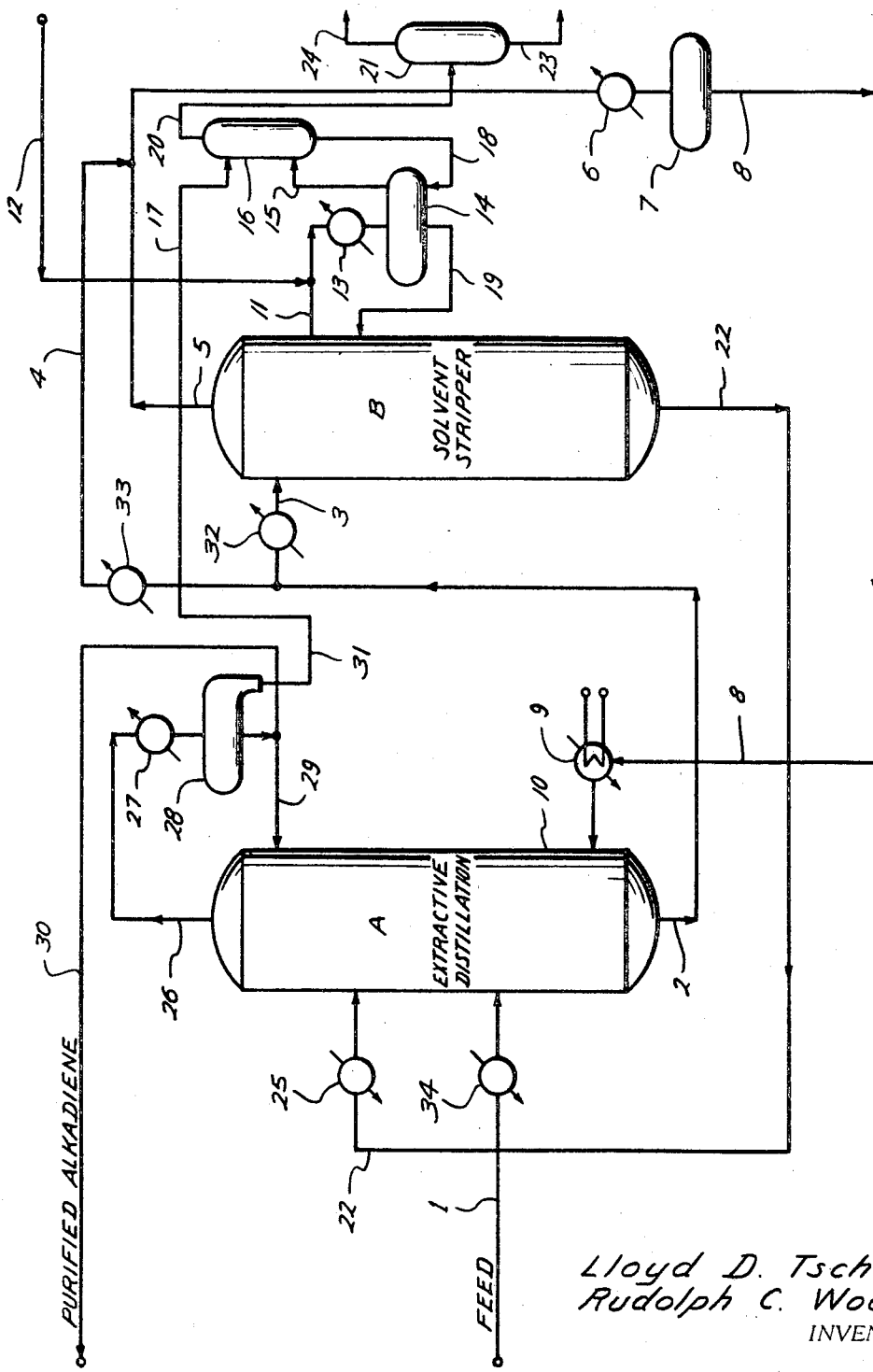

3,496,069
PURIFICATION OF UNSATURATED HYDRO-
CARBONS BY EXTRACTIVE DISTILLATION
WITH RECYCLE OF STRIPPER OVERHEAD
Lloyd D. Tschopp, Humble, and Rudolph C. Woerner, Houston, Tex., assignors to Petro-Tex Chemical Corporation, Houston, Tex., a corporation of Delaware
Filed Nov. 9, 1967, Ser. No. 681,613
Int. Cl. C07c 7/08, 11/12; B01d 3/34
U.S. Cl. 203—53
15 Claims

ABSTRACT OF THE DISCLOSURE

Preparation of high purity alkadienes of 4 or 5 carbon atoms containing low quantities of alkynes. Integrated operation of extractive distillation zone and solvent stripping zone to produce high purity alkadiene from the extractive distillation zone and stream high in alkynes from solvent stripping zone. Preferred procedure for safely handling alkyne stream.

BACKGROUND OF THE INVENTION

Field of the invention

This application relates to the preparation of an alkadiene of 4 to 5 carbon atoms, such as butadiene-1,3 or isoprene, with the product containing substantially reduced quantities of alkynes such as 4 or 5 carbon alkynes. The purification scheme includes an extractive distillation step.

Description of the prior art

Alkadienes are prepared commercially by dehydrogenation of alkanes or alkenes. The dehydrogenation products contain other hydrocarbons in addition to alkadiene. To obtain high purity alkadiene the dehydrogenated product is normally fractionated to concentrate the alkadiene and the resulting product is either pasesd through a cuprous ammonium acetate solution wherein the alkadiene is dissolved or is treated by extractive distillation with a solvent such as furfural which dissolves alkadiene and the alkadiene is then desorbed from these media. In most processes, particularly when extractive distillation is employed, the desorbed material is fractionally distilled to produce the desired alkadiene. Alkadiene which is purified by extractive distillation, as with furfural, and a final fractionation normally contains alkyne as an impurity in the final product. It has been quite difficult, on a commercial scale, to produce high purity alkadiene without carrying objectionable quantities of alkynes which cannot be readily separated by fractional distillation along with the alkadiene. For instance, it is well known that vinyl acetylene is an objectionable impurity in butadiene, particularly when the butadiene is to be used in polymerization processes to make synthetic rubbers, such as copolymers of butadiene and styrene, and butadiene and acrylonitrile. Further, it is the practice in the synthetic rubber industry to conduct the reaction of butadiene and styrene to less than complete conversion of monomers to polymer, and in such cases, it is economically essential that the unreacted butadiene be recovered and recycled in the polymerization processes. When the butadiene initially employed contains vinyl acetylene in amounts at the allowable maximum, the vinyl acetylene in the recycled butadiene builds up quite rapidly with subsequent additional and accelerated deleterious effects on the polymerization reactions and products.

Many processes for reducing the alkyne content of $C_4$ to $C_5$ alkadienes have been proposed. Examples of these processes may be found, for instance, in Kroper et al., U.S. 3,242,227, Clay, U.S. 3,293,316, King et al., U.S. 3,317,627, etc. Prior art processes suffer from various disadvantages. The principal disadvantage of some processes is that the alkyne content is not adequately reduced or that elaborate equipment is required. One particular drawback of prior art processes involving solvent extraction is that undesirable reactions between the alkyne and the solvent or between the alkyne and other materials or with itself are permitted. These undesired reactions cause fouling of equipment and reduction in the rate of production. Another principal problem involves the handling of high concentrations of liquid alkynes such as vinyl acetylene, which is extremely dangerous in this form. Still other drawbacks are such as the loss of relatively high percentages of the alkadiene and the requirement that large volumes of material be transported.

Accordingly, it is an object of this invention to provide an improved economical process for preparing high purity alkadiene containing minimum amounts of alkyne with a minimum loss of alkadiene. Another object is to provide a process which has reduced maintenance costs and reduced loss of solvent as a result of lower rates of reaction of alkyne with other components and still another preferred object is to provide a process wherein high concentrations of liquid alkynes are not handled.

SUMMARY OF THE INVENTION

According to this invention a separation process is provided which comprises passing a hydrocarbon mixture comprising a $C_4$ to $C_5$ alkadiene contaminated with a minor portion of alkyne to an extractive distillation zone wherein the said hydrocarbon mixture is contacted with a solvent which is selective for the alkyne, passing from the lower region of said extractive distillation zone a solvent stream containing alkadiene and alkyne to a solvent stripping zone, withdrawing from said solvent stripping zone a volatile overhead reduced in alkyne content, condensing said volatile overhead to form a condensed overhead, passing at least the major portion of said condensed overhead from said solvent stripping zone through a heater such as a reboiler and to the lower region of said extractive distillation zone, the temperature in the lower region of the extractive distillation zone being lower than the boiling point of said solvent, passing a stream rich in solvent from the lower region of said solvent stripping Zone to said extractive distillation zone, withdrawing from the said solvent stripping zone at a point below the point of entry of said solvent containing alkadiene and alkyne a mixture having alkyne in substantially increased proportion, and withdrawing as a volatile product from said extractive distillation zone an alkadiene product substantially reduced in alkyne content.

BRIEF DESCRIPTION OF THE DRAWING

One preferred method of conducting the process of this invention is illustrated in the drawing. An organic feed 1 comprising a hydrocarbon mixture containing $C_4$ or $C_5$ alkadiene contaminated with a minor portion of alkyne is fed to extractive distillation zone A. A solvent which dissolves both alkadiene and alkyne and which preferentially dissolves alkyne is fed to zone A as solvent stream 22. A rich solvent stream 3 is fed to a solvent stripping zone B and lean solvent 22 is returned to zone A. The overhead 5 from zone B is cooled and condensed in condenser 6 and accumulated in accumulator 7. Liquid phase hydrocarbon 8 is fed to a reboiler 9 and into the lower portion of zone A. Composition taken from the lower portion of zone A may also be partially recycled through the reboilers as shown. The overhead 26 from zone A may be cooled and condensed and partially recycled to the top of zone A. High purity alkadiene containing substantially reduced alkyne content is taken as product 30. Stream 11 is taken from solvent stripper B at a point below entry of stream 3, may be diluted with an inert gas 12, cooled in partial condenser 13 and accumulated at 14 and partially recycled as stream 19. The stream 20 containing a high concentration of alkyne may then be separated in separator 21 to produce an alkyne product 23 and an alkadiene product 24.

DESCRIPTION OF THE PREFERRED EMBODIMENT

In order that those skilled in the art may more fully appreciate the nature of the invention and a method for carrying it out, it will be more specifically described in connection with the accompanying drawing which is a flow sheet of one form of the invention. The process will be illustrated by the use of particular pieces of equipment, but it is understood that alternate equipment may be employed. Conventional auxiliary equipment such as pumps, additional heating and cooling means, compressors, etc. have not been shown as this type of equipment is well known to those skilled in the art.

The feed 1 to the extractive distillation zone A will comprise alkadienes of 4 to 5 carbon atoms contaminated with minor amounts of alkyne of the same number of carbon atoms. Also present may be other hydrocarbons such as alkanes and alkenes generally in minor amounts. Thus, the alkadiene may be butadiene-1,3 contaminated with vinyl acetylene or may be isoprene contaminated with such as isopropyl or isopropenyl acetylene and perhaps 1-pentyne or 2-pentyne. Mixtures of alkadienes and alkynes may be fed. This feed stream will normally be a hydrocarbon stream and may contain other components such as hydrocarbons of 2 to 8 carbon atoms. Preferably, the major hydrocarbon component will be alkadiene of 4 to 5 carbon atoms, and alkyne will be present in an amount of less than 5 liquid volume percent based on the volume of 4 to 5 carbon alkadienes. This stream 1 may also contain solvent which is employed in the extractive distillation zone A. Also, a composition containing solvent may be taken from the extractive distillation zone A such as from the lower half of the column and mixed with feed 1 prior to entry of the extractive distillation zone. The extractive distillation zone A may be any conventional equipment such as a plate type column. The bottoms 2 contains solvent together with alkadiene and alkyne dissolved therein. This rich solvent is fed to the solvent stripping zone B as stream 3 after cooling in cooler 32. The solvent stripping zone B may be conventional equipment such as a plate type stripper. It is a feature of this invention that stream 3 is introduced into the solvent stripper at a point where the temperature is lower than the point at which stream 11 is taken from the solvent stripper. That is, in a column-type stripper stream 3 will be added at a point higher than the point of withdrawal of stream 11. A portion of this bottoms 2 may be fed as a liquid stream 4 and mixed with the overhead 5 from the solvent stripper. This feature is claimed in our copending application Ser. No. 681,609, filed on even date herewith. The overhead 5 is cooled and condensed in condenser-cooler 6 and accumulated in accumulator 7. This liquified overhead stream 8 is then fed to reboiler 9 and into the lower portion of the extractive distillation zone A. The reboiler 9 may be separate from or an integral part of the extractive distillation zone A. In the reboiler stream 8 is partly vaporized and the composition is allowed to pass upward as a vapor through extractive distillation zone A. Stream 8 contains a high concentration of alkadiene and a reduced concentration of alkyne as compared with feed 1. If desired, this stream may also contain solvent used in the extractive distillation zone. Extractive distillation zone overhead 26 is condensed at 27, accumulated at 28, and normally a portion is recycled as stream 29. High purity alkadiene is obtained as stream 30. Stream 30 is substantially reduced in alkynes of 4 to 5 carbon atoms (such as vinyl acetylene when the product is butadiene-1,3 or isopropenyl acetylene

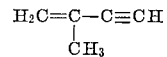

and isopropyl acetylene

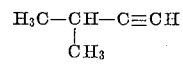

if the product is isoprene) as compared to the feed 1. At least 50 mol percent of these 4 to 5 carbon alkynes may be removed from stream 1 by the process of this invention and ordinarily in excess of 90 or 95 mol percent can be separated. The content of 4 to 5 carbon alkynes in stream 30 will be dependent somewhat on the content of feed 1 but under normal conditions the stream will contain less than 400 parts per million by liquid volume percent of the alkynes selected from the group consisting of vinyl acetylene, isopropyl acetylene, isopropenyl acetylene or mixtures thereof based on the alkadiene and much lower concentrations such as less than 250 or 200 parts per million. Of course, the final alkadiene product may contain substantially less alkynes than in stream 30 as further purification of this stream may be accomplished downstream such as by fractionation. Stream 22 contains stripped or lean solvent and is returned to extractive distillation zone A suitably through a cooler 25.

Stream 11 contains a high concentration of alkyne and is taken at a point below the entry point of stream 3. Stream 11 may also be taken as a bottoms from solvent stripper B in which case provision must be made for separation of hydrocarbons from solvent according to this invention; however, this stream is preferably taken from the upper two-thirds of the solvent stripper. One preferred feature of this invention is illustrated as stream 12 which shows the addition of an inert diluent to stream 11 prior to cooling and condensation. Stream 12 may be such as natural gas or any other suitable diluent which will dilute the concentration of alkyne in liquid phase. Stream 11 is cooled and partially condensed at 13 and accumulated in accumulator 14. Normally a portion of this accumulated mixture will be recycled as stream 19 to the solvent stripper. The composition in accumulator 14 will contain solvent, including water if water is also employed as part of the solvent, alkyne and generally some alkadiene. The uncondensed fraction from the accumulator 14 may be suitably fed as stream 15 to solvent absorber 16 for washing the composition to separate solvent from hydrocarbon. The solvent absorber 16 may be any apparatus for liquid-gas contacting such as a packed or plate column. However, if a condenser is not employed to condense stream 11, this stream 11 could be fed directly to the solvent absorber 16 where some condensation might take place.

Another optional feature of this invention constitutes the use of the accumulated water from accumulator 28 which is fed as stream 31 to the solvent absorber. By so using the water accumulated in 28, the water balance in the system is maintained at more nearly equilibrium, and it is not necessary to remove water from the system to prevent water build-up. However, water from any other source may be used as water stream 31. The hydrocarbon stream 20 contains alkyne and usually alkadiene. This stream may also contain inert diluent 12. If desired, this hydrocarbon stream may be separated by any means shown as 21 to recover alkyne such as by fractionation or refrigeration and fractionation to separate an alkyne stream 23 and an alkadiene stream 24, or alternately stream 20 may be hydrogenated to convert the alkyne to an alkene and alkadiene mixture. This stream may also be returned as a feed to a dehydrogenation reactor. Preferred as step 21 is a fractionating column especially when the alkadiene is butadiene-1,3. At this point the interfering alkenes preferably have been essentially removed. The same is true of any alkanes that might have been present. Hence, there is an improvement for the straight fractionation of $C_4$ hydrocarbons. In the case of butadiene-1,3 and vinyl acetylenes the butadiene-1,3 would come off overhead as stream 24 and vinyl acetylenes would be stream 23.

According to this invention, the temperature in the lower region 10 of the extractive distillation zone A is maintained at a lower temperature than ordinarily would be present in extractive distillation utilizing any particular solvent. This lower temperature retards the formation of alkyne polymers or reaction products with alkyne with other components such as solvent, etc. By the use of a liquid composition 8 the compression of a hydrocarbon stream containing relatively high concentrations of alkadiene is avoided. Avoiding this compression step, the formation of alkadiene polymers is also avoided. Furthermore, the expensive compression step is avoided. According to the invention, stream 8 may be simply pumped without compression from the accumulator to the reboiler.

The solvent stripper is operated at a relatively low pressure and consequently the solvent stripper may be operated at a low temperature. By low temperature operation various problems are avoided in the solvent stripper. The same type of problem which would be encountered in the lower regions of the extractive distillation zone are avoided.

The extractive distillation zone employed may be any type column or units known to those skilled in the art to be useful in extractive distillation processes. Such columns may include trays or packing, and the like. The size of the column, of course, will depend upon the flow rates required and the degree of alkyne extraction desired or required. The reboiler 9 may be in the bottom of the zone A or may be a separate unit in the stream prior to entry to the zone A. As mentioned above, the temperatures in the extractive distillation zone A are maintained lower than for conventional extractive distillation with a given solvent. For instance, the maximum temperature in the zone can be maintained at a temperature of no greater than 300° F. and may be no greater than 275° F. Of course, the temperatures in the extractive distillation zone will depend upon the particular solvent used, but these figures will illustrate temperatures that can be maintained, e.g. with a furfural-water solvent such as an 8 percent by weight water solvent. Regardless of solvent, the boiling point of the composition in the lower region of the extractive distillation zone A, such as the bottoms shown as stream 2 in the drawing, will be lower than the boiling point would have been if the overhead from the solvent stripper were not fed to the extractive distillation zone. This boiling point preferably will be at least 20° F., and more preferably at least 50 or 60° F. lower, than the boiling point at the same pressure of the solvent (including any water) used for extractive distillation. The point of solvent entry to the zone will generally be the solvent point highest possible consistent with a satisfactory and desired elimination of solvent from the overhead product and will preferably be in the upper third of the zone A.

The solvents employed in the extractive distillation zone may include any of the polar solvents known to selectively separate alkynes from alkadienes such as acetone, acetonitrile, beta, beta-dichloroethyl ether, dimethylacetamide, dimethylformamide, dimethylsulfoxide, dioxane, furfural, methyl ethyl ketone, N-methylpyrrolidone, phenol, mixtures of these solvents with one another or with water, and the like. Normally, any of the polar solvents or mixtures thereof which are ordinarily employed in extractive distillation of hydrocarbons may be used. Use of any of the known polar solvents containing small amounts of water, as about 1 to about 25 percent is applicable. A preferred solvent is furfural containing from 1 to 25 percent by weight of water.

The solvent stripper zone according to this invention is operated at a relatively low temperature and pressure and preferably will be at a lower pressure than the extractive distillation zone. At the point of taking off of the alkyne containing stream preferably the temperature will be no greater than 300° F. The pressure in the solvent stripper will also preferably be less than 75 p.s.i.g. and suitably may be 50 p.s.i.g. or less. The stripper may be such as a plate type or packed column and may be any acceptable equipment for stripping off alkadiene as an overhead leaving solvent containing alkyne dissolved therein. Desirably, the zone will contain a substantial quantity of water in order to lower the concentration of alkyne, with this being particularly desirable at the point at which the alkyne containing stream is taken from the zone. The stream containing alkyne withdrawn from the solvent stripper will suitably contain water in an amount of at least 90 percent of the weight of the alkyne present in the stream. The process is less hazardous if the alkyne being withdrawn is at least 75 mol percent (and preferably essentially all) in vapor phase at the point of withdrawl. The concentration of alkyne will generally be at least 5 mol percent of the alkadiene in the stream. The alkyne containing stream may be taken as the bottoms from the solvent stripper in which case the solvent and alkyne will have to be separated; however, the sidestream withdrawal is a preferred feature of this invention. Solvent stream 22 may if desired be mixed with the overhead from the solvent stripper, that is, partly or completely used instead of any stream 4.

One of the principal advantages of this invention is that at no point is alkyne concentrated in liquid phase at relatively high temperatures. For example, preferably the alkyne will be present in liquid phase in a concentration of less than 50 liquid volume percent when the temperature is 150° F. or greater. Also preferably the alkyne will not be present in a concentration of greater than 60 mol percent (that is, even in vapor phase) prior to any separation of alkyne from alkadiene. For example, at no point prior to step 21 of the drawing will alkyne exceed this 60 mol percent fraction according to this preferred feature of the invention.

A specific example of the invention will now be illustrated. Reference is made to the drawing. All percentages are liquid volume percentages unless stated otherwise. Certain conventional equipment and means have not been shown as these are well known to those skilled in the art. The extractive distillation zone A is illustrated as an extractive distillation column with bubble cap plates. Hydrocarbon feed 1 is fed to the column A in an amount of about 102 barrels per hour constituting 87.62 percent butadiene-1,3, 11.87 percent butylene-2, 0.41 percent vinyl acetylene, and a minor amount of water. The composition as it enters the column A may also suitably be mixed with recycled composition taken from column A with the net feed consequently containing considerable solvent. This reflux step is not shown on the drawing. The feed is heated in heater 34 prior to entry to maintain the conditions in column A. The solvent 22 fed to the column contains 8 percent water and 92 percent furfural and is fed at a rate of 564 barrels per hour. The overhead 26 from the column is at a pressure of 54 p.s.i.g. and a temperature of 110° F. The flow rate of stream 26 is 473 thousand standard* cubic feet per hour. The feed as it enters the column is at a temperature of 144° F. The maximum temperature in the column is 230° F. and at a pressure of 62.4 p.s.i.g. The bottoms 2 from column A contains 8.35 percent butadiene-1,3, 0.77 percent butylene-2, 0.37 percent vinylacetylene, 7.78 percent water and 82.73 percent furfural. This stream is cooled in cooler 32 and fed as stream 3 to the solvent stripper B at a rate of 630 barrels per hour and at a temperature of 161° F. This stream 3 is fed to the upper tray of the solvent stripper which is a plate type column. A preferred embodiment of this invention is illustrated in the use of stream 4 wherein a portion of the liquid bottoms 2 is combined with the overhead 5 from the solvent stripper suitably after cooling in cooler 33. This preferred feature is claimed in our copending application entitled "Hydrocarbon Separation" filed on even date herewith. The overhead 5 is at a temperature of 210° F. and a pressure of 29.5 p.s.i.g. The flow rate of this stream 5 is 144 thousand standard cubic feet per hour. This stream 5 is mixed with stream 4 and cooled and condensed in condenser 6. The overhead accumulator 7 is used to receive the overhead condensate. The composition 8 contains 26.92 percent butadiene-1,3, 2.49 percent butene-2, 0.95 percent vinylacetylene, 2.48 percent water and 67.16 percent furfural. Recycling the contents of accumulator 7 may also be provided. Stream 8 is fed to a reboiler 9 and thereafter to the bottom 10 of column A. Heat is provided in reboiler 9 such that the temperature in the bottoms of column A is 230° F. at 62.4 p.s.i.g. The reboiler 9 may be an integral part of column A.

Stream 11 is a vapor stream and is taken from column B from tray 12 of a 50 tray column at a rate of 5260 pounds per hour. Stream 11 contains 4.78 percent butadiene, 0.11 percent butene-2, 4.54 percent vinyl acetylene, 53.69 percent water and 36.88 percent furfural. This stream is cooled in and partially condensed in 13 and the condensate is received in accumulator 14. Stream 19 is recycled to column B with the rate of this recycled stream being 14.13 barrels (calculated at 60° F.) per hour. Stream 12 is natural gas which is mixed with stream 11 prior to condensation. Stream 15 is a vapor stream containing 42.33 percent methane, 27.50 percent butadiene, 0.67 percent butene-2, 24.69 percent vinyl acetylene, 3.03 percent water and 1.77 percent furfural. Item 16 is a solvent absorber. The solvent is washed with water from stream 17. Stream 17 is taken from the extractive distillation column accumulator 28, and consists of the relatively small amount of water which has distilled overhead from column A and collected in accumulator 28 as a liquid phase. A furfural and water stream 18 is recycled to the accumulator 14. The vapor stream 20 contains 43.54 percent methane, 28.33 percent butadiene, 0.63 percent butene-2, 25.42 percent vinylacetylene and 2.08 percent water. This stream may be disposed of in any manner but it is a feature of this invention that both butadiene-1,3, and vinyl acetylene may be recovered as products from this stream such as by refrigeration and separation means shown as 21. Vinyl acetylene 23 and butadiene 24 products are so obtained.

The overhead 26 from column A is at a temperature of 110° F. at a pressure of 54.4 p.s.i.g. The flow rate of stream 26 is 473 thousand standard * cubic feet per hour. This composition is cooled and condensed in cooler 27 and accumulated in accumulator 28. Recycled stream 29 is fed to the top of column A at a rate of 130 barrels per hour. Stream 30 is the purified butadiene-1,3 product containing 87.93 percent butadiene, 11.96 percent butene-2, 110 parts per million vinyl acetylene by liquid volume and 0.102 percent water. This stream may be fractionated to separate butadiene-1,3 from butene-2 if desired.

Although the invention has been illustrated for the separation of vinyl acetylene from butadiene-1,3 similar results may be obtained for the separation of C₅ acetylenic compounds from isoprene.

We claim:
1. A separation process which comprises passing a hydrocarbon mixture comprising a $C_4$ to $C_5$ alkadiene contaminated with a minor portion of alkyne to an extractive distillation zone wherein the said hydrocarbon mixture is contacted with a solvent which is selective for the alkyne, passing from the lower region of said extractive distillation zone a solvent stream containing alkadiene and alkyne to a solvent stripping zone, withdrawing from said solvent stripping zone a volatile overhead reduced in alkyne content, condensing said volatile overhead to form a condensed overhead, passing said condensed overhead from said solvent stripping zone to a reboiler and to the lower region of said extractive distillation zone, the temperature in the lower region of the extractive distillation zone being lower than the boiling point of said solvent, passing a stream rich in solvent from the lower region of said solvent stripping zone to said extractive distillation zone, withdrawing from the said solvent stripping zone at a point below the point of entry of said solvent containing alkadiene and alkyne a mixture having alkyne in substantially increased proportion, and withdrawing as a volatile product from said extractive separation zone a purified alkadiene product substantially reduced in alkyne content.

2. A process according to claim 1 wherein the said solvent comprises furfural and water.

3. A process according to claim 1 wherein the overhead from the extractive distillation zone is condensed and liquid solvent is fed to the upper region of the extractive distillation zone at a point above the entry of the said mixture comprising a $C_4$ to $C_5$ alkadiene contaminated with a minor amount of alkyne.

4. A process according to claim 1 wherein the volatile product from the extractive distillation zone contains less than 200 parts per million of a member selected from the group consisting of vinyl acetate, isopropyl acetylene, isopropenyl acetylene or mixtures thereof.

5. A process according to claim 1 wherein the said mixture having alkyne in substantialy increased proportion is taken from the solvent stripping zone as a side stream at a point within the upper two-thirds of the solvent stripping zone.

6. A process according to claim 1 wherein the said mixture having alkyne in substantialy increased proportions is taken from the solvent stripping zone with the alkyne being predominantly in the vapor phase and prior to condensation of said alkyne in the vapor phase diluting the vaporous mixture with an inert diluent.

7. A process according to claim 1 wherein the said solvent stripping zone is operated at a pressure lower than the extractive distillation zone, the temperature in the extractive distillation zone is less than 275° F. and the temperature is less than 300° F. in the solvent stripping zone at the point where the said mixture having alkyne in substantially increased proportion is withdrawn from the solvent stripping zone.

8. A process according to claim 1 wherein the said alkyne is not present in liquid phase in a concentration of greater than 50 liquid volume percent at any point where the temperature is 150° F. or greater.

9. A process according to claim 1 wherein said solvent is selected from the group consisting of acetone, acetonitrile, beta-beta-dichloroethyl ether, dimethylacetamide, fufural, dimethylformamide, dimethylsulfoxide, dioxane, methyl-ethyl ketone, N-methyl pyrrolidone, phenol and aqueous mixtures thereof.

10. A process according to claim 1 wherein the said alkadiene is butadiene-1,3 and the said alkyne is vinyl acetylene.

11. A process according to claim 1 wherein the water obtained by condensing the overhead from the extractive distillation zone is used to wash the said mixtures having alkyne in substantially increased proportion which is taken from the solvent stripping zone.

12. The process of claim 1 wherein the mixture taken from the solvent stripping zone and having alkyne in substantially increased proportion is separated to produce butadiene-1,3 and vinyl acetylene as products.

13. The process of claim 1 wherein the overhead from the solvent stripping zone is not compressed prior to feeding to said reboiler.

14. The process of claim 1 wherein the boiling point of the composition in the lower region of the said extractive distillation zone is at least 20° F. lower than the boiling point of the said solvent at the same pressure.

* Calculated at 60° F. and 14.7 p.s.i.a.

15. The process of claim 1 wherein the said solvent containing alkadiene and alkyne passed from the lower region of the extractive distillation zone to the solvent stripping zone is cooled prior to entry to the solvent stripping zone.

References Cited
UNITED STATES PATENTS

| | | | |
|---|---|---|---|
| 3,000,794 | 9/1961 | Tschopp | 260—681.5 X |
| 3,230,157 | 1/1966 | Hill et al. | 203—53 |
| 3,242,227 | 3/1966 | Kroeper et al. | 260—681.5 |
| 3,293,316 | 12/1966 | Clay | 260—681.5 |
| 3,317,627 | 5/1967 | King et al. | 260—681.5 |
| 3,320,138 | 5/1967 | Brandt et al. | 203—58 |
| 3,436,436 | 4/1969 | Takao et al. | 260—681.5 |
| 3,436,438 | 4/1969 | Takao et al. | 260—681.5 |

PAUL M. COUGHLAN, JR., Primary Examiner

G. E. SCHMITKONS, Assistant Examiner

U.S. Cl. X.R.

203—50, 54, 57, 58, 60, 62, 63, 65, 78; 260—677, 681.5

PO-1050
(5/69)

UNITED STATES PATENT OFFICE
CERTIFICATE OF CORRECTION

Patent No. 3,496,069          Dated Feb. 17, 1970

Inventor(s) Tschopp, et al

It is certified that error appears in the above-identified patent and that said Letters Patent are hereby corrected as shown below:

Col. 1, line 38, "pasesd" should read --- passed ---.

Col. 2, line 45, "Zone" should read --- zone ---.

Col. 7, line 15, "bottom 10" should read --- bottoms 10 ---.

Col. 8, line 26, "vinyl acetate" should read --- vinyl acetylene ---.

SIGNED AND
SEALED
JUL 28 1970

(SEAL)
Attest:

Edward M. Fletcher, Jr.
Attesting Officer

WILLIAM E. SCHUYLER, JR.
Commissioner of Patents